June 23, 1942.  W. AULL, JR  2,287,160
ELECTRICAL COMMUNICATION
Filed Nov. 6, 1939
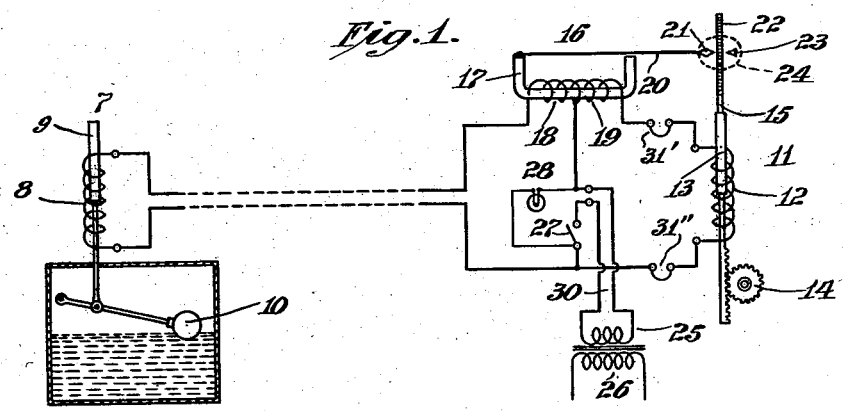
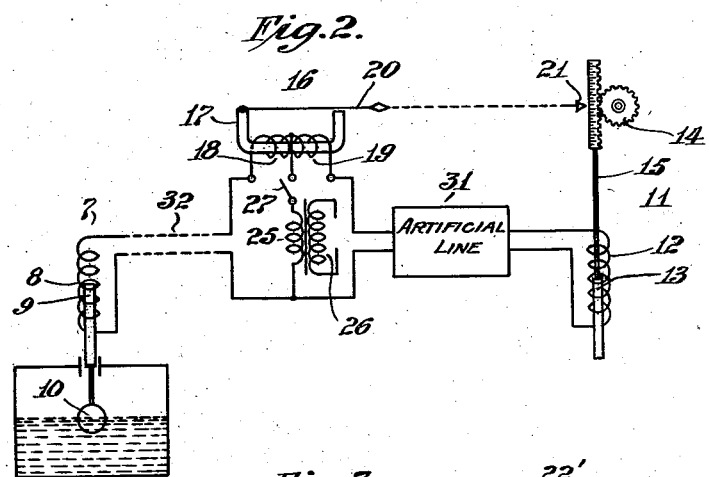
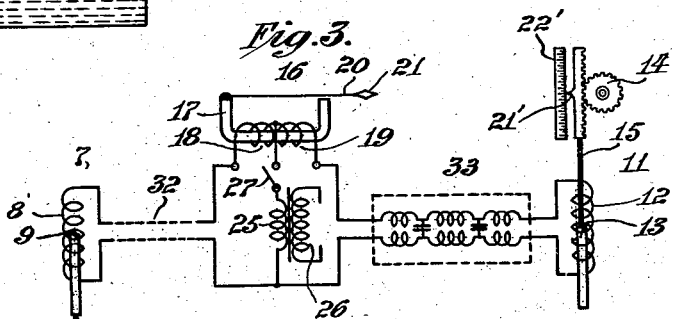
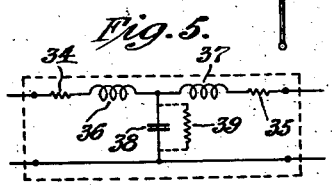
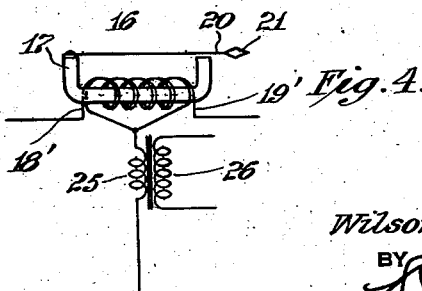
INVENTOR
*Wilson Aull Jr.*
BY
ATTORNEY Patented June 23, 1942

2,287,160

UNITED STATES PATENT OFFICE 2,287,160

ELECTRICAL COMMUNICATION

Wilson Aull, Jr., Flushing, N. Y.

Application November 6, 1939, Serial No. 303,097

3 Claims. (Cl. 177—351)

The main purpose of this invention is to provide simple and inexpensive but reliable means for ascertaining at a receiving point changes which have taken place at a remote or transmitting point. Such apparatus is available for indicating changes in temperature and movements of elements such as the rise and fall of liquids arranged to cause changes in impedance at a transmitting point in an electric circuit.

I have especially sought to find a simplified system capable of operating on a low voltage current derived from a household lighting circuit, for instance, utilizing an ordinary stepdown bell ringing transformer.

In its preferred form the invention employs two variable impedance devices such as solenoids, one at the transmitting station and one at the receiving station. An electromagnetic device having a tuned vibrating reed tuned to the frequency of the current supply system includes two electrically identical but opposing coils in circuit with the respective impedance devices. An alternating current supply is connected between the junction point of the two impedances and the junction point of the two opposing coils, somewhat in the manner of the familiar Wheatstone bridge circuit. When the impedances are out of balance the reed vibrates and when they are balanced the reed comes to rest. Suitable calibrated scales and indices may be arranged to indicate the adjustment of the impedance at the receiving station necessary to balance the circuits.

Fig. 1 is a diagrammatic view of apparatus embodying one form of my invention.

Fig. 2 is a somewhat modified arrangement employing an artificial compensating line.

Fig. 3 is a similar diagram but showing one form of filter system or artificial compensation.

Fig. 4 is a detail view showing another form of coil construction.

Fig. 5 is a diagrammatic showing of a well known form of artificial line suitable for compensating a relatively short line.

The transmitting station 7 has a coil 8 with an armature or core 9 by which its impedance is varied, for instance by reason that the rise or fall of the liquid level float 10 causes the core to lie within the field of the coil to a greater or less extent. At the receiving station 11 is a coil 12 having similar characteristics to those of coil 8 and an armature or core 13 which is movable in some suitable manner as, for instance, by turning the gear 14 so as to move the shaft 15 longitudinally. This shaft is connected to the core 13 and the movement of the latter will change the impedance of the coil 12.

An electromagnetic device 16 has a core 17 with two opposed but equivalent coils 18 and 19 in circuit respectively with the coils 8 and 12. This device has a small tuned reed 20 which will vibrate whenever there is an unbalanced current affecting the magnetic field of 16.

When the reed vibrates it is practically invisible but it is preferably provided with an enlarged tip 21 which can be seen when the reed ceases to vibrate. This tip may serve as an indicator in connection with a scale 22 connected to the shaft 15 or a stationary index 23 may be employed. In any event the index or indicator should be visible for instance through a window 24, in case the device is enclosed in a case or cabinet.

Current (preferably of low tension such as 6 to 12 volts) is supplied to the junction point between the coils 18 and 19 and to the junction point between the coils 8 and 12, for instance from the secondary 25 of a bell ringing transformer whose primary 26 is connected to the house wiring circuit of say 110 volts. The local circuit may have a switch 27 and a local signal or reading lamp 28 may be provided, located in such a position as to facilitate reading the scale 22. Jumpers 31' and 31'' are for purposes to be later described.

In Fig. 4 I have shown a bifilar winding having the two coils 18' and 19' of the electromagnetic device with the conductors wound side by side or in parallel but connected so as to offset or counterbalance each other when the current flow through each is equal, which occurs when the two branches are balanced. In Figure 3 I have also shown a fixed scale 22' and a movable pointer 21', the latter being carried by and movable with a portion of element 15. In this case the vibrating reed need not be placed in proximity to the indicating scale, but may be placed at any convenient spot and will serve to show when the bridge circuit becomes unbalanced or balanced, respectively.

The receiving instrument is extremely simple and inexpensive and need not in fact include the transformer since that is quite often already found in a house wiring system. The leads 30 may be an ordinary twisted pair and require no special installation. By keeping the transformer out of the instrument bridge circuit there is no danger of disturbing the accuracy of measurement and its location is unimportant. Nor is the value of the secondary impedance and connecting wire resistances critical.

When the transmitter is located at a considerable distance from the receiver it may be necessary to install an artificial line 31 shown in Fig. 2 to correspond with the characteristics of the line 32 or the filter system 33 of Fig. 2 in order to keep the circuit balanced or symmetrical. Such an artificial line may consist of a network of inductance, capacity and resistance having electrical constants simulating those of the line 32 extending from the transmitter to the indicator and it will be connected near the receiver.

Fig. 5 shows a well known network representing a relatively short line. Resistances 34 and 35, each equivalent to one-half of the total line resistance, and inductances 36 and 37, each equivalent to one-half of the total line inductance, are placed on each side of the shunt branch. The shunt capacity 38 represents the total line capacity and the shunt resistance 39 represents the total line leakage.

For balancing a short line from the transmitter but one of somewhat greater length than would ordinarily be used in the usual household installation, a compensating resistance and inductance may be inserted at either jumper 31' or 31" (Fig. 1). For distances somewhat greater,—on the order of a few hundred feet,— it may be preferable to insert half the balancing resistance and inductance on each side of the receiving solenoid, that is, at 31' and 31".

One other method for use with a very long uniform line consists in associating an impedance corrective network with such a line which reduces its input impedance to a non-inductive resistance. A non-inductive resistance of equivalent value may then be inserted in the receiver solenoid circuit to balance that of the line and its corrective network.

While the circuit arrangement has been shown with equal turns in transmitting and receiving solenoids and in both portions of the electromagnetic reed indicator windings, the invention is not limited to this design.

It is conceivable that for some purposes another than one to one ratio would be desirable in the bridge arms. This would be true, for example, if different size solenoids were used at transmitter and receiver positions. In such a case a bifilar winding would, of course, not be used for the reed actuating coils but windings of other than one to one ratio would be utilized such as to satisfy the conditions for bridge balance. Equal and opposite flux can be indicated when the ampere turns of each winding are equal, although the turns are unequal, thus producing a neutralized field as far as the reed indicator is concerned.

It should be understood that the variable elements, i. e. the inductance devices 7 and 11 might be replaced by other types of variable reactance or by variable resistance devices.

It will be noted that the sensitive indicating element merely vibrates when the conditions in the transmitting and receiving circuits are unbalanced. There are no pivots or bearings to require adjustment or lubrication as in the types of galvanometers usually used in connection with indicating devices. The circuit is such that the accuracy is unaffected by variations in line voltage. The movement of the core 13 may be utilized to move either the scale 22 as shown in Fig. 1 or the index 21' with respect to a stationary scale 22' as shown in Fig. 3.

I claim:

1. Means for measuring changes which comprises variable transmitting and receiving impedances, an electro-magnetic device having a tuned reed and two opposed and equalized coils in series with the respective impedances and means for adjusting the receiving impedance and at the same time moving an indicating device.

2. An indicating device for liquid level gauges and the like wherein the indicator is separated from the liquid to be measured by a substantial distance, including a first solenoid having a core adapted to be moved in accordance with changes of the liquid level, a second similar solenoid having a core adapted to be manually moved, a scale for indicating the degree of movement of the core of said second solenoid, a mid-tapped vibrating reed indicator physically adjacent said second solenoid and resonant to a predetermined frequency, a physical transmission line connecting said first solenoid and one end of said indicator and an artificial transmission line, substantially equivalent electrically to said physical line connecting said second solenoid and the other end of said indicator, said lines being interconnected so that said indicator forms with both said solenoids and both said lines a single series circuit, and means for supplying alternating current of said predetermined frequency connected between the mid-tap of said indicator and the common junction of said two transmission lines, said interconnected elements forming an A. C. bridge circuit wherein core movement of said first solenoid will unbalance the bridge and will cause the reed indicator to vibrate, and wherein compensatory core movement of said second solenoid will restore bridge balance and stop vibration of the reed indicator.

3. A remotely indicating device adapted to indicate changes of liquid level and the like by a bridge circuit including a first solenoid with a movable core, means for moving said core in accordance with changes of liquid level, a second solenoid with a movable core, located at the remote indicating point, means for manually moving the core of said second solenoid and a scale indicating the degree of movement thereof, a closed circuit line of substantial length connecting said two solenoids and possessing considerable reactance, a corrective network associated with said line and reducing its reactance at a predetermined frequency substantially to zero, a mid-tapped vibrating reed indicator resonant to said predetermined frequency and connected in series with the electrical center of one side of the line through a non-reactive resistance substantially equal in value to the corrected impedance of said line so as to balance the bridge circuit by the use of resistance only, and a source of alternating current having a frequency correspondent to the frequency to which said vibrating reed indicator is resonant and connected between the mid-tap of said indicator and the electrical center of the other side of said line, whereby movement of the core of said first solenoid will unbalance said bridge circuit and cause vibration of said reed indicator and whereby compensatory of the core of said second solenoid will re-balance said bridge and cause said reed to cease vibrating.

WILSON AULL, Jr.